US008401726B2

(12) United States Patent
Bouvier et al.

(10) Patent No.: US 8,401,726 B2
(45) Date of Patent: Mar. 19, 2013

(54) MAINTENANCE INTERVAL DETERMINATION AND OPTIMIZATION TOOL AND METHOD

(75) Inventors: Ken D. Bouvier, Renton, WA (US); Brian C. Fredgren, St. Peters, MO (US); Fritz Scholz, Shoreline, WA (US); Roberto E. Altschul, Seattle, WA (US); Shuguang Song, Seattle, WA (US)

(73) Assignee: The Boeing Company, Chicago, IL (US)

( * ) Notice: Subject to any disclaimer, the term of this patent is extended or adjusted under 35 U.S.C. 154(b) by 67 days.

(21) Appl. No.: 11/489,864

(22) Filed: Jul. 20, 2006

(65) Prior Publication Data
US 2008/0021604 A1    Jan. 24, 2008

(51) Int. Cl.
*G01M 17/00* (2006.01)
*G06F 7/00* (2006.01)
*G06F 11/30* (2006.01)
*G06F 19/00* (2011.01)
*G07C 5/00* (2006.01)

(52) U.S. Cl. ...................................... 701/29.1; 701/29.4
(58) Field of Classification Search ................... 701/29, 701/30, 29.1–29.9, 30.1–30.9; 340/457.4
See application file for complete search history.

(56) References Cited

U.S. PATENT DOCUMENTS

| | | | |
|---|---|---|---|
| 6,505,106 B1 * | 1/2003 | Lawrence et al. | 701/35 |
| 7,286,916 B2 * | 10/2007 | Hoeflacher et al. | 701/29 |
| 2002/0174384 A1 * | 11/2002 | Graichen et al. | 714/37 |
| 2004/0117051 A1 * | 6/2004 | Ford | 700/109 |
| 2006/0111871 A1 * | 5/2006 | Winston et al. | 702/184 |

FOREIGN PATENT DOCUMENTS
EP    07014280.7-2221    5/2008

* cited by examiner

*Primary Examiner* — Thomas Tarcza
*Assistant Examiner* — Imran Mustafa
(74) *Attorney, Agent, or Firm* — Parsons Behle & Latimer

(57) ABSTRACT

A Maintenance Interval Determination and Optimization Tool (MIDOT) provides optimized maintenance schedules for performing maintenance tasks on one or more components or systems based on component survival functions and economic analysis of non-safety tasks associated with maintenance schedules. MIDOT is used for specified platforms such as aircrafts. The MIDOT filters maintenance history data, uses a statistical analysis to predict likely maintenance needs, and performs an economic analysis to optimize aircraft maintenance schedules. Specifically, the MIDOT calculates component survival probability, based on the specific usage of one or more related components within the platform and determines an optimal maintenance task interval to perform a maintenance task associated with the one or more related components.

17 Claims, 3 Drawing Sheets

MAINTENANCE INTERVAL DETERMINATION AND OPTIMIZATION TOOL AND METHOD

FIELD OF THE INVENTION

The present invention generally relates to a system and method that optimizes maintenance schedules associated with commercial fleet vehicles, especially aircrafts.

BACKGROUND

Performance of maintenance tasks associated with commercial aircraft fleets has both operational and economic impacts on the daily operations of the aircraft fleet. It is important to precisely determine optimal times or intervals for maintenance tasks to be performed to efficiently run an airline.

Aircraft scheduled maintenance task intervals are currently determined using broad-brush technical data analysis techniques and "best engineering estimates." Existing maintenance schedules are based on the use of an average time between unscheduled removals. Intervals associated with maintenance tasks are based on use of a percentage of average time between unscheduled component removals.

While existing devices suit their intended purpose, there remains a need to provide an optimal maintenance schedule for components and systems associated with a platform such as an aircraft based on the specific usage and the probability of survival of one or more related components. Additionally, there remains a need for an economic analysis of total costs associated with performing maintenance on components/systems which are designated as non-safety related.

SUMMARY

The present invention provides a Maintenance Interval Determination and Optimization Tool (MIDOT) that operates to provide specific component survival functions using a detailed systematic approach, and to perform an economic analysis on non-safety tasks associated with maintenance schedules for a specified platform, such as an aircraft. The MIDOT allows differentiation and specificity of calculations used for maintenance interval determination.

The tool and method of the present invention filters maintenance history data, uses a statistical analysis to predict likely maintenance needs, and performs an economic analysis to optimize aircraft maintenance schedules.

The MIDOT calculates component survival probabilities, based on the specific usage of one or more related components within the platform and determines an optimal maintenance task interval to perform a maintenance task associated with the one or more related components.

The MIDOT operates to utilize historical data from one or more components within a platform; associate a maintenance task with the one or more related components; and determine an optimal maintenance task interval to perform the associated maintenance task on the one or more related components.

The optimal maintenance task interval is determined using a survival probability threshold associated with each of the one or more related components on a particular platform.

Also, an economic analysis of a suggested maintenance task interval may be performed for non-safety tasks.

BRIEF DESCRIPTION OF THE DRAWINGS

These and other objects, features and advantages of the present invention will become apparent from the following detailed description and the appended drawings in which.

DETAILED DESCRIPTION

Figure 1:
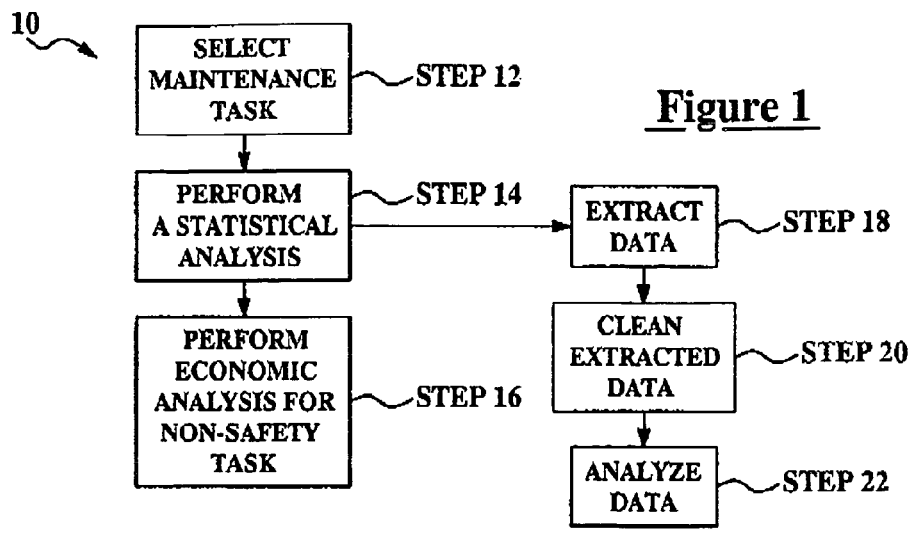
FIG. 1 illustrates a method of using a maintenance interval determination and optimization tool to determine an optimal maintenance task interval in accordance with an embodiment of the present invention.

The MIDOT allows scheduled maintenance tasks to be optimized. The optimized maintenance task schedule operates to reduce operator maintenance costs, and further operates to increase aircraft availability by reducing the amount of time the platform is in maintenance.

As shown herein, the MIDOT is used to optimize maintenance schedules for aircrafts, however, it is contemplated that the tool of the present invention may be used to optimize maintenance schedules for any mass transportation platforms such as but not limited to fleets of boats or buses.

As disclosed herein for non-limiting illustrative purposes, the MIDOT optimizes scheduled maintenance intervals for maintenance tasks to be performed on aircraft.

The MIDOT optimizes scheduled maintenance tasks by reducing operator maintenance costs, and maintenance times and increasing aircraft availability.

A Maintenance Interval Determination and Optimization Tool interval is determined in accordance with a specific survival function percentage or economic benefit.

The tool and process may be used by any entity that has access to raw maintenance data of the detail and quality that is needed to perform the analysis. For example, the process of the present invention may be applied to or sold as a service to an airline for service of aircrafts or to any mass transit industry having a fleet of complex mass transportation devices such as, but not limited to fleets of boats and buses. The analysis process may be performed interactively or may be performed substantially automatically through use of software components.

The present invention generally relates to a Maintenance Interval Determination and Optimization Tool (MIDOT) and method that provides the probability of survival of a component, based on the specific usage of that component. The MIDOT and method provides an end-user the ability to assign a maintenance task interval that falls within a specified survival function percentage or economic benefit.

The MIDOT ensures that maintenance task intervals are specific to and appropriate for each resultant component or system failure that is being addressed by an associated maintenance task, and further provides an economic analysis associated with non-safety tasks.

The MIDOT captures historical data, applies defined parameters to clean and categorize the data, then applies a statistical distribution method such as a Weibull analysis developed by Waloddi Weibull to produce a component survival function. An economic analysis may then be performed to evaluate the feasibility of maintenance intervals associated with non-safety tasks.

The MIDOT may be used in combination with an integrated maintenance and materials service (IMMS) as is disclosed in co-pending U.S. patent application Ser. No. 11/281,279 entitled "Centralized Management of Maintenance and Materials for Commercial Aircraft Fleets", the entire contents of which are herein incorporated by reference including associated information disclosure statements.

As used herein, IMMS means a service program provided to a customer that combines and integrates both maintenance services and the IMM. The tool operates to gather data from the IMMS through a suitable communication link, such as for example, an Internet web portal accessible through a web user interface. The IMMS may have one or more server each having an associated component maintenance database, an associated clean component maintenance data database and maintenance task database in communication with both the component maintenance database and the associated clean component maintenance data database.

The MIDOT provides a plurality of modules associated with the IMMS including a maintenance task selection module that operates to associate one or more components associated with a platform with a maintenance task; a statistical calculation module capable of performing a statistical analysis on one or more related components if similar tasks or components exist on another platform having a same associated failure cause to determine a suggested maintenance task interval associated with the maintenance task; and an economic analysis module capable of performing an economic analysis if the maintenance task is a non-safety task.

FIG. 1 illustrates a flowchart depicting a method 10 of using the MIDOT to: select a maintenance task associated with one or more components associated with a platform (step 12); perform a statistical analysis on one or more related components if similar tasks or components exist on another platform having a same associated failure causes to determine a suggested maintenance task interval associated with the maintenance task (step 14); and perform an economic analysis if the maintenance task is a non-safety task.

Additionally, the step of performing a statistical analysis on one or more related component if similar tasks or components exist on another platform having a same associated failure to determine a suggested maintenance task interval associated with the maintenance task provides the following substeps: extracting component maintenance data from a component maintenance database (Step 18); cleaning the extracted data (Step 20); and analyzing the data to produce a component survival function (Step 22).

The MIDOT uses a detailed systematic approach to extract, analyze and justify component and maintenance task data, which enables consistent, accurate results when determining maintenance task intervals.

The associated maintenance task may be selected from either a safety or a non-safety task.

Additionally, components are classified into three classification areas including safety, operational and economic components. Typically, in an aircraft redundancy of components is built into the aircraft to allow for failures of one or more of the components without losing functionality of all of the components. Safety components affect the safe operation of an aircraft; operational components affect scheduling of aircraft flights, and economic components have associated cost implications but do not necessarily interrupt an aircraft schedule.

To determine if redundant components are safety or economic components, consideration is given to whether a functional failure of the component affects safety or causes secondary damage that has an adverse operational affect on safety of the platform. If the functional failure does negatively affect safety, then the component is a safety component. If the functional failure does not affect safety of the platform, then the component is an economic part.

Similarly, safety tasks include tasks associated with a component or system of related components that correlate to safety of the aircraft. If a component or system associated with a safety task fails, then the safety of the aircraft may be negatively impacted.

Safety tasks involve maintenance on evident failures, wherein evident failures are discovered during servicing or maintenance of an aircraft or are indicated through use of an associated indicator. Each safety related task or component must be inspected for failures.

Non-Safety tasks include tasks that are accomplished for economic reasons to help prevent operational interruptions such as schedule interruptions. The cost associated with performing a non-safety (operational or economic) task may be more than a cost incurred by failure of the associated component.

A method of using the MIDOT includes the steps of providing one or more components within a platform;

associating a maintenance task with the one or more related components; and determining an optimal maintenance task interval to perform the associated maintenance task on the one or more related components.

Additionally, a step of determining a survivability threshold of time within a specific survival function percentage for the one or more related components based on usage of the one or more related components within the platform is provided.

The one or more related components defines an electromechanical system of components. Additionally, the platform may be an aircraft.

Figure 2:
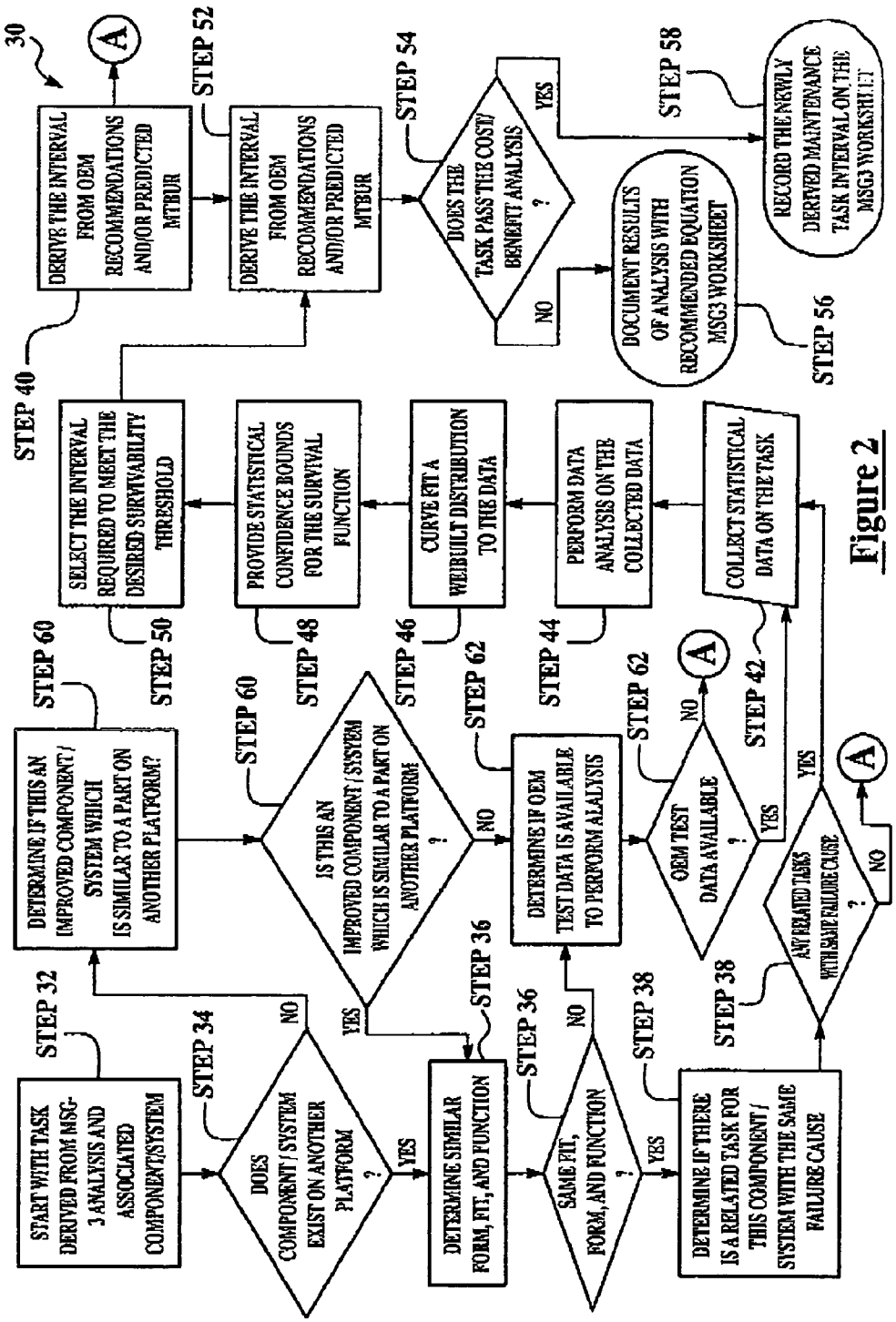
FIG. 2 illustrates an operational flow diagram that uses a maintenance interval determination and optimization tool to determine an optimal maintenance task interval associated with a non-safety task in accordance with an embodiment of the present invention.
Figure 3:
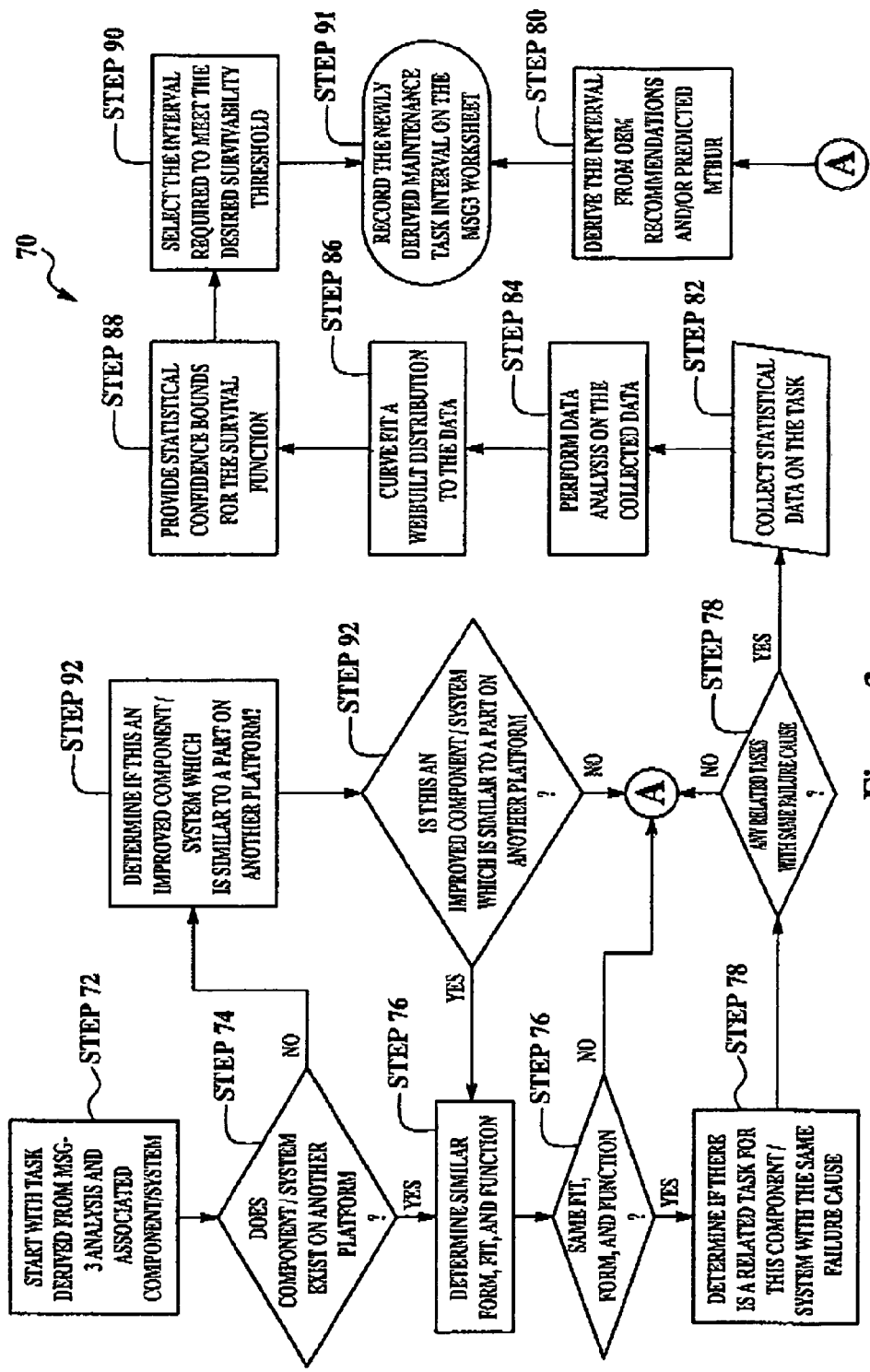
FIG. 3 illustrates an operational flow diagram that uses a maintenance interval determination and optimization tool to determine an optimal maintenance task interval associated with a safety task in accordance with an embodiment of the present invention.

More particularly, a method of using the system of the present invention is shown in FIGS. 2-3. FIG. 2 illustrates an economic and operational flow chart 30 for non-safety related tasks in accordance with an embodiment of the present invention. FIG. 3 illustrates a-flow chart 70 for-safety related tasks in accordance with an embodiment of the present invention.

Initially, a task selected from a safety or non-safety task is provided using an Air Transport Association (ATA) MSG-3 analysis for an associated component or system (step 32, shown in FIG. 2), (step 72 shown in FIG. 3).

The ATA MSG-3 that defines an industry Standard Maintenance program for the aircraft industry and is published as a manual for Operator/Manufacturer Scheduled Maintenance Development (Revision 2005.1, 2005) published by the ATA of Washington, D.C.

Referring now to FIG. 2, as shown in step 32, if a non-safety task is selected, then a decision is made whether one or more related components exist on another platform (step 34).

If the one or more related components do exist on another platform, a determination is made whether the component or system of related components performs a similar form, fit, and function on the other platform (step 36).

Another platform may include an existing aircraft or a future aircraft not yet in production. The inspection or maintenance schedule associated with the future aircraft may be estimated using similar data from an existing aircraft relating to a component or system that has a similar functionality to an existing component or system.

If the one or more related components or system of components does perform the same form, fit, and function as the component or system of related components on another platform, then a determination is made if there is a related non-safety task associated with the similarly situated component or system of components, wherein the similarly situated component or system of components is associated with a same failure cause as the one or more related components being analyzed (step 38).

If the related task is not associated with one or more components having the same failure cause, then a optional maintenance task interval is determined from an original equipment manufacturer's (OEM) recommendations in combination with of a predicted Mean Time Between Unscheduled Removals (MTBUR) or alternatively, the maintenance task interval may be determined from only the predicted MTBUR (step 40).

Once an optimal maintenance task interval is determined, then an economic analysis as further defined herein is performed to determine whether to accomplish the non-safety task (step 52). The economic analysis evaluates associated costs and benefits with the determined optimal maintenance task interval.

After the economic analysis is performed, a decision is made whether the non-safety task passes the economic analysis (step 54). If the non-safety task does not pass the economic analysis, then documentation of the results of the analysis are included in combination with recommendations provided in an MSG-3 worksheet (step 56). If the non-safety task does pass the economic analysis then the task is recorded with the optimal maintenance task interval on an associated MSG-3 worksheet (step 58).

If the one or more related component or system does not exist on another platform, then a determination is made if the one or more related components or system are components or system similar to another related component or system of components on another platform (step 60).

If the one or more components are improved components or systems similar to the components on another platform, then step 36 may be performed. If the component is not an improved component or system which is similar to a component on another platform, then a determination is made if OEM test data is available to perform an analysis on the component or system (step 62).

If no OEM test data is available to perform an analysis on the component or system, then the maintenance task interval from the OEM may be determined from the OEM's recommendations in combination with predicted MTBUR results or from the predicted MTBUR results alone (Step 40).

If OEM test data is available, then an analysis of the data may be performed. The analysis of the data includes the steps of extracting the data, cleaning the data and analyzing the data using a statistical analysis.

Initially, maintenance data for each component or system of related components associated with a particular aircraft are collected from a component maintenance database. The component maintenance data including dates components were removed from an aircraft are considered in a statistical analysis such as, but not limited to a Weibull analysis. The Weibull analysis also considers factors such as flight cycles, and flights hours performed in association with each of the components or systems of components having associated component maintenance data.

The statistical analysis includes a step of analyzing the collected data and verifying that a suggested maintenance task interval meets a specified component survival function percentage.

The maintenance data for each component or system of components is associated with a specified maintenance task and is collected as statistical data (Step 42). Additional steps of collecting statistical data includes extracting component maintenance data from component maintenance database, and cleaning the extracted component maintenance data.

In particular the step of Extracting the Data includes extracting airline maintenance data, which includes component removal records, line maintenance records, and shop repair records. The first step in the MIDOT extracting the data process is to extract removal data using a customized query. The customized query searches the airline maintenance data for all removal events of a specified one or more related components or system. The search criteria may include, but is not limited to, for example, airplane model and date range, and Assigned Subject Numbers (ASN) or component numbers. The output of the customized query contains, for each removal event, the data fields necessary to identify relevant removal events and to perform a Weibull analysis on the relevant removal events. The data fields may include, for example, information such as aircraft serial number, component removal date, complaint text, maintenance action text, component number, and ATA code.

The initial query results are then output or exported into a clean component maintenance data database.

The results of the extracted data are often too generalized and must be cleaned to ensure the integrity of the data included in a statistical analysis. The resultant extracted data is cleaned to preserve the integrity of the component maintenance data.

The extracted data is cleaned to exclude irrelevant data. The steps of cleaning the data involve elimination of non-relevant data, i.e. "non-event data" such as data that is not relevant for what the MIDOT needs to analyze with respect to a maintenance schedule. Non-event data includes data relating to events where removal of one or more related components that did not fix the complaint associated with the one or more related components and to events where removal of one or more components was due to of the one or more components for use on another platform, known as "robbing" a component or system of components for use in another airplane, wherein the term "robbing" a component means that a component that functions properly on a particular aircraft has been removed to another aircraft.

Typically, the robbed component will be replaced within a day or two by either a new or refurbished component, and then the lifetime of the newly replaced component is calculated from when it is either removed from the airplane in accordance with a maintenance schedule or when the component fails.

When a component is new, then a first lifetime of the component is considered. Typically, in complex electro-mechanical systems such as an aircraft, redundant components within systems are used. For example, if three identical components are provided in a redundant system, only failed components are replaced and the non-failed components are not replaced. If all three components are working initially, and one of the redundant components fails at a subsequent date, the time between the first usage of the component within the system and a first failure of the component is considered a first lifetime of each of the components in the system. Future failures of the remaining non-failed components are considered when determining subsequent lifetimes of each of the remaining components.

Alternatively, lifetimes of each of the respective components may be considered and the position of each of the redundant components within an associated system may be considered to more accurately reflect actual components lifetimes of each component within a system.

Additionally, non-event data may include data associated with components that are removed due to non-maintenance related schedules such as service directives.

If there has been a service directive requiring that particular components or all components associated with a particular system be replaced, then data relating to components removed in light of a service directive are identified as such.

Once the initial query results are exported into the clean component maintenance data database, a customized version of text mining is employed. Initial cleaning is performed at the query level, by incorporating text mining into the query language. Basic text mining at the query level excludes records of events where removal of the one or more related components did not fix an associated complaint or was not relevant to the associated complaint.

Text mining is customized to each specific one or more related components and failure modes associated with each of the one or more related components or system under review. In some cases, it is necessary to read through the removal data to ensure that the data set is void of any non-events.

The cleaned component maintenance data forms a clean data set and may be used to define a cleaned removal event table, wherein the clean data set and cleaned removal event table may be further analyzed by the MIDOT.

Next, a data analysis is performed on the collected and cleaned data (step 44) by use of a statistical analysis process, such as, for example a Weibull analysis based on a Weibull distribution.

The steps of analyzing the data may include determining associated component lifetimes for each of the one or more components from the clean data set; plotting the associated component lifetimes in a Weibull distribution of the clean data set to form plotted component lifetime data points; performing a Weibull analysis on the plotted component lifetime data points; and determining an optimal maintenance interval for each maintenance task to be performed on the one or more related components.

More particularly, the step of analyzing the data (Step 44) may be performed by using component times derived from the clean data set and perform a Weibull Analysis of the data. The data points included in the Weibull analysis are component lifetimes derived from the clean data set. Component lifetimes are the times to first removal on each aircraft, the flight hours between consecutive removals on the same aircraft, or the right-censored times, which are the hours without failure so far on each aircraft, robbed components, or components removed by service directive.

To determine component lifetimes, the cleaned removal event table is merged with aircraft flight hour table by operator, manufacturer serial number, year and month. Lifetimes are plotted on a Weibull curve, from which our interval is derived.

Step 46 illustrates the step of curve fitting a Weibull distribution to the collected data (step 46).

Next, statistical confidence bounds are provided for the interval survival function (Step 48). The final step of statistically analyzing the data includes selecting an interval within the confidence bounds to meet the survival probability threshold of the component or system (step 50).

A maintenance task interval required to meet a survivability threshold means that a probability level is selected that shows a probability of a component surviving a specified threshold of time. For example, if a 70 percent threshold is specified, this means that 70 percent of components survive until the threshold time specified, thus, if the threshold time is met, then an inspection needs to be performed at that time.

In some situations use of survivability threshold depends on whether the task is a safety, an economic, or an operational task.

Figure 4:
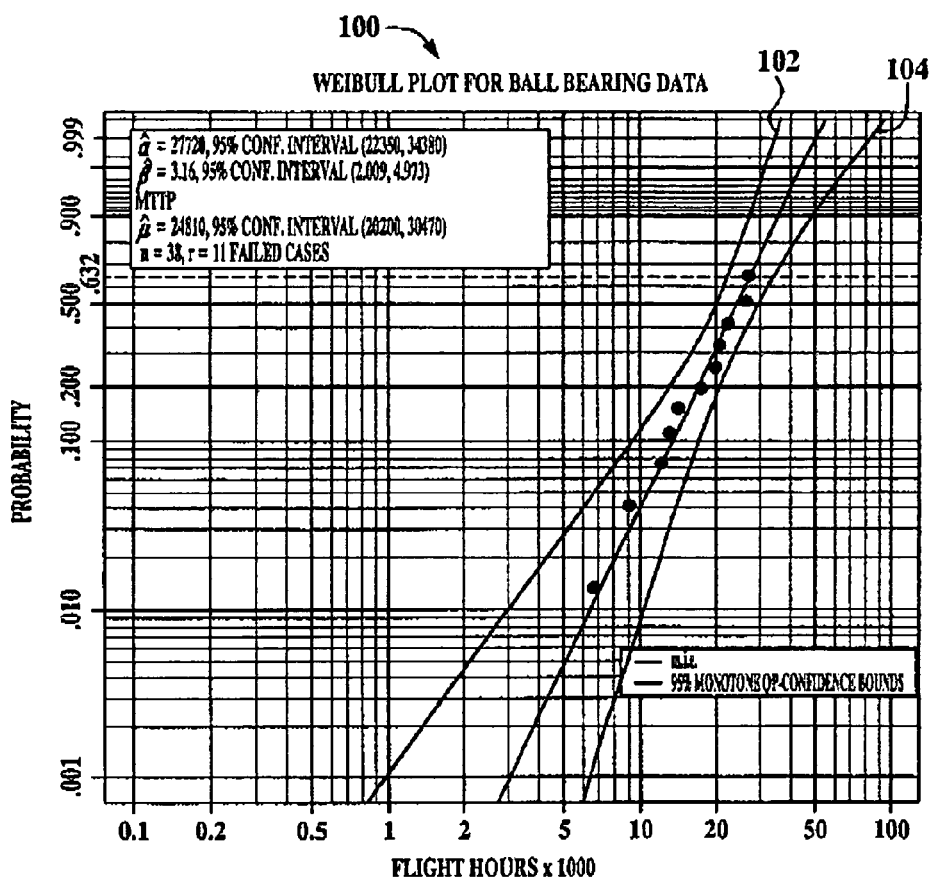
FIG. 4 illustrates a Weibull Plot for Ball Bearing Data used in accordance with a maintenance interval determination and optimization tool of the present invention.

FIG. 4 illustrates a Weibull plot 100 of Ball Bearing Data. The plot was created from lifetime data from 38 ball bearings, 11 of which were actual lifetimes, while the other 27 were right censored lifetimes. Right censored means that the 27 ball bearing lifetimes were recorded as having lived at least as long as the recorded time, but had not yet failed at the time the maintenance task was performed. However, the ball bearing will fail some time after the-recorded time.

Alpha ($\alpha$) and beta ($\beta$) are parameters that characterize which Weibull distribution selected from a plurality of Weibull distributions was fitted to the Ball Bearing Data as will be appreciated by a skilled artisan.

The MTTF represents mean time to failure; m.l.e. represents maximum likelihood estimates, which is the most popular estimation technique used in statistics. 95 percent confidence intervals were given for the various quantities of flight hour time associated with the ball bearing components. The confidence intervals cover the true unknown quantities with 95 percent assurance, i.e., for 95 percent of such random data samples.

The qp-confidence bounds refers to quantile/probability confidence bounds, and represent intervals between the first and second curves 102, 104 (either horizontally or vertically).

The attribute "monotone" just indicates that the curves AA, BB are monotone increasing, as described in accordance with Fritz Scholz's publication entitled "Unified Confidence Bounds for Censored Weibull Data with Covariates", presented at the workshop Stochastische Modelle für Zuverlässigkeit, Qualität und Sicherheit, Mar. 19-Mar. 22, 2001 in Weißig (Sächsische Schweiz) near Dresden, Germany.

The classical bounds are not guaranteed to be monotone. Thus, the Weibull plot illustrates a 0.632 probability level associated with survivability of a ball bearing component at a threshold time of 27,720 flight hours.

Referring once again to FIG. 2, after analyzing the data (steps 42-50), an economic analysis (steps 52-54) is performed.

After the Weibull analysis is performed on the extracted and cleaned data, and a suggested interval has been identified for a non-safety task, an economic analysis is performed in order to evaluate the costs and benefits associated with the suggested interval.

Based on the results of the Weibull analysis, a mathematical simulation occurs to generate projected component removal rates. The rates are then input into an economic model.

The economic analysis weighs the costs and benefits of an existing interval against the costs and benefits associated with the suggested interval. Included in the analysis are key cost factors including labor rate and labor hours associated with the scheduled maintenance task, along with the costs associated with unscheduled maintenance and schedule interruptions.

The economic analysis includes the step of performing a cost and benefit analysis to determine whether or not to accomplish the suggested task (step 52). The task determination step may be made by determining if the task passes the cost benefit analysis performed (step 54).

Factors considered in performing the economic analysis for an associated task include labor costs associated with task being analyzed, wherein the task relates to performing a maintenance action; component costs associated with a particular component that needs replacing; component removal rates based on component failures wherein the removal rate information may be calculated using the statistical analysis described herein or based on predicted MTBUR or OEM recommendations; and schedule interruption costs including consideration of interruptions in flight schedules when performing a maintenance task.

Once the factors in the economic analysis are considered, the MIDOT performs simulations that balance costs associated with a particular maintenance task if the task is performed at discrete time intervals, the associated labor tasks and the prevention of schedule interruptions. The shorter the time interval occurs between tasks, the less likely that the schedule is to be interrupted. Alternatively, the longer the time interval between tasks occurs, the labor cost associated with the task decrease and the chance of a schedule interruption increases.

To make the economic benefit determination, all associated economic costs are considered in light of the proposed maintenance interval schedule determined in the Weibull analysis to determine if the maintenance interval is feasible.

For example, past component failures considered in the Weibull analysis help determine a predicted failure rate in the future. The predicted future failure rate may then be used to calculate component removal rates and thus, the removal rates are factored into economic analysis.

If the task does pass the cost benefit analysis (labor, material, associated service interruption costs are less than the labor, material, associated service interruption costs if task was not accomplished), then the task is recorded as a newly determined optimal task interval on an MSG-3 worksheet (step 58).

If the task does not pass the cost benefit analysis (labor, material, associated service interruption costs are more than the labor, material, associated service interruption costs if task was not accomplished), then the results of the analysis are included with recommendations in an MSG-3 worksheet (step 56).

Another embodiment of a method of using the MIDOT for safety related tasks is shown in FIG. 3. More particularly, FIG. 3 illustrates a method for determining an optimal interval for a safety related maintenance task.

If a safety task is selected, then a process shown in FIG. 3 is performed. Initially, a decision is made whether the component exist on another platform (step 72).

A task is derived from a MSG analysis from an associated component or system task (step 72). Next, a determination is made whether a component or system is exists on another platform (step 74). If a component or system exists on another platform then it is determined whether the component or system from another platform performs a similar form, fit, or function as the component or system identified (step 76). If it is determined that a related task exists for the similar form, fit, and function component or system having a same failure cause, then steps 82-88 may be performed, wherein steps 82-84 analyze related tasks having the same failure cause.

If the component or system does not exist on another platform as a result of the determination made in step 74, then a determination is made if the component or system is an improved component or system similar to another component on another platform. If it is an improved component or system similar to another component on another platform, then step 76 may be performed.

If it is determined that an improved component is not similar to another component or system on another platform (step 74), then step 80 may be performed, wherein step 80 determined an optimal maintenance task interval from an OEM recommendation and from or in combination with predicted MTBUR data.

Data analysis is performed to determine an optimal maintenance task interval if there are related tasks associated with a same failure cause. The data analysis step includes the substeps of: collecting statistical data on the task (step 82), performing data analysis on the collected data (step 84), curve fitting a Weibull distribution to the data (step 86), providing statistical confidence bounds for the survival function (step 88), and the step of selecting an interval required to meet the desired survivability threshold (step 90).

The steps 82-90 shown in FIG. 3 with regard to determining a safety task maintenance interval are similar to the steps 42-50 shown in FIG. 2 described with reference to determining a non-safety task interval.

Finally, the newly determined optimal maintenance task interval is recorded on an associated MSG-3 worksheet (step 90).

A skilled artisan will appreciate that the foregoing examples are illustrative only, and not limitative of the scope of the technology.

From the foregoing, it should be appreciated that several embodiments and methods of using the MIDOT have been provided.

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

What is claimed is:

1. A method of using a maintenance interval determination and optimization tool (MIDOT) for optimizing a maintenance schedule associated with commercial fleet vehicles comprising the steps of:

collecting historical maintenance data from one or more components within a platform, said platform comprising commercial fleet vehicles, said one or more components comprising vehicle components selected from an entire vehicle in addition to said vehicle engine;

associating a maintenance task with the one or more components;

determining an optimal maintenance task interval to perform the associated maintenance task on the one or more components, said optimal maintenance task interval determined according to statistical analysis that determines a survival probability function including selected confidence bounds, said survival probability function comprising a plotted Weibull distribution of associated component lifetimes, said component lifetimes derived from specific actual usage of each of said one or more components, said maintenance task interval selected within said confidence bounds to equal a survival probability threshold of the one or more components surviving a specified time, said survivable probability function derived from said historical maintenance data, said historical maintenance data comprising a same associated maintenance task or cause associated with the one or more components, the step of determining of an optimal maintenance task interval to perform the associated maintenance task on the one or more components including the steps of:

extracting component maintenance data associated with the one or more components from a component maintenance database, the step of extracting the component data including the steps of:
  querying a component maintenance database to extract component maintenance data including removal data associated with removal events of the one or more components; and
  exporting the extracted query results to a second component maintenance database;
processing the component maintenance data to remove data that is not relevant to the associated maintenance task, the step of processing the component data including the steps of:
  using the exported extracted query results to form a second data set;
  identifying data related to removal of each of the one or more components to service another platform; and
  identifying data related to removal of components that are removed due to non-maintenance related schedules such as service directives; and
analyzing the component maintenance data to determine said optimal maintenance task interval that meets a specific survival function percentage comprising said survival probability function, the step of analyzing the data including the steps of:
  determining associated component lifetimes for each of the one or more components from the second data set;
  plotting the associated component lifetimes in said Weibull distribution of the second data set to form plotted component lifetime data points;
  performing a Weibull analysis on the plotted component lifetime data points;
  determining said optimal maintenance interval for each maintenance task to be performed on the one or more related components; and
  comparing the optimal maintenance interval with an existing maintenance interval to determine if use of the optimal maintenance interval is economically feasible for a non-safety task; and
incorporating said optimal maintenance task interval in said maintenance schedule associated with said commercial fleet vehicles.

2. The method of claim 1, wherein the one or more components are related components that define an electro-mechanical system of components.

3. The method of claim 1, wherein the platform is an aircraft.

4. The method of claim 1, wherein the step of associating a maintenance task comprises the step of:
  selecting the maintenance task from a non-safety task performed for economic reasons to reduce operational interruptions.

5. The method of claim 1, further comprising the step of:
  performing an economic analysis to determine whether costs associated with performing the associated maintenance task according to the optimal maintenance task interval for the one or more components is feasible, wherein the associated maintenance task is a non-safety task.

6. The method of claim 1 further comprising determining that the one or more components perform a similar form, fit, and function on another platform.

7. The method of claim 1, wherein the step of analyzing the component maintenance data comprises the step of:
  identifying the optimal maintenance task interval based on said specific component survival function percentage.

8. The method of claim 1, wherein the step of processing the maintenance data further comprises the steps of:
  removing non-event data from the component maintenance data, wherein the non-event data includes data relating to events including removal of one or more related components that did not fix a complaint associated with the one or more related components or was not relevant to the associated complaint.

9. The method of claim 1, further comprising the step of:
  performing an economic analysis to evaluate associated costs and benefits with the optimal maintenance task interval.

10. The method of claim 6, further comprising determining that there is a related non-safety task associated with similarly situated one or more components on the other platform and that the related non-safety task has a same failure cause as the one or more components subject to the determination of the optimal maintenance task interval, the component maintenance database includes data associated with the other platform.

11. The method of claim 1, further comprising determining that the one or more components do not exist on another platform, but perform a similar form, fit, and function to improved one or more components on the other platform.

12. The method of claim 11, further comprising determining that there is a related non-safety task associated with similarly situated one or more components on the other platform and that the related non-safety task has a same failure cause as the one or more components subject to the determination of the optimal maintenance task interval, the component maintenance database being associated with the other platform.

13. A method of using a maintenance interval determination and optimization tool for optimizing a maintenance schedule associated with commercial fleet vehicles comprising the steps of:
  collecting historical maintenance data from one or more components within a platform, said platform comprising commercial fleet vehicles, said one or more components comprising vehicle components selected from an entire vehicle in addition to said vehicle engine;
  selecting a maintenance task associated with said one or more components;
  performing a statistical analysis on one or more components to determine a suggested maintenance task interval associated with the maintenance task, said statistical analysis determining a survival probability function including user selected confidence bounds, said survival probability function comprising a plotted Weibull distribution of associated component lifetimes said component lifetimes derived from specific actual usage of each of said one or more components, said maintenance task interval selected within said confidence bounds to equal a survival probability threshold of the one or more components surviving a specified time, said survivable probability function derived from said historical maintenance data, said historical maintenance data comprising a same maintenance task or cause associated with the one or more components, the step of determining of an optimal maintenance task interval to perform the associated maintenance task on the one or more components including the steps of:
  extracting component maintenance data associated with the one or more components from a component maintenance database, the step of extracting the component data including the steps of:

querying a component maintenance database to extract component maintenance data including removal data associated with removal events of the one or more components; and exporting the extracted query results to a second component maintenance database;

processing the component maintenance data to remove data that is not relevant to the associated maintenance task, the step of processing the component data including the steps of:

using the exported extracted query results to form a second data set;

identifying data related to removal of each of the one or more components to service another platform; and identifying data related to removal of components that are removed due to non-maintenance related schedules such as service directives; and analyzing the component maintenance data to determine said optimal maintenance task interval that meets a specific survival function percentage comprising said survival probability function, the step of analyzing the data including the steps of:

determining associated component lifetimes for each of the one or more components from the second data set;

plotting the associated component lifetimes in said Weibull distribution of the second data set to form plotted component lifetime data points;

performing a Weibull analysis on the plotted component lifetime data points;

determining said optimal maintenance interval for each maintenance task to be performed on the one or more related components; and comparing the optimal maintenance interval with an existing maintenance interval to determine if use of the optimal maintenance interval is economically feasible for a non-safety task;

performing an economic analysis to determine whether costs associated with performing the associated maintenance task according to the suggested maintenance task interval is feasible if the maintenance task is a non-safety task; and incorporating said optimal maintenance task interval in said maintenance schedule associated with said commercial fleet vehicles.

14. The method of claim 13, wherein the step of performing a statistical analysis on one or more components to determine a suggested maintenance task interval associated with the maintenance task comprises:

determining that the one or more components have similar tasks for components existing on another platform having a same associated maintenance cause.

15. The method of claim 14, wherein the component maintenance database includes data associated with the other platform.

16. A maintenance interval determination and optimization software tool comprising programmed instructions stored in computer readable memory for optimizing maintenance schedules associated with commercial fleet vehicles comprising:

a maintenance task selection module that operates to associate one or more components associated with a platform with a maintenance task, said one or more components comprising vehicle components selected from an entire vehicle in addition to said vehicle engine; and a statistical calculation module comprising programmed instructions stored in computer readable memory, said programmed instructions performing a statistical analysis based on historical maintenance data comprising said one or more components or based on historical maintenance data comprising similar tasks for components existing on another platform having a same associated maintenance cause, said statistical calculation module comprising programmed instructions to determine a suggested maintenance task interval associated with the maintenance task, said statistical calculation module comprising programmed instructions to determine a survival probability function including user-selected confidence bounds, said survival probability function comprising a plotted Weibull distribution of associated component lifetimes, said associated component lifetimes derived from specific actual usage of each of said one or more components, said suggested maintenance task interval selected within said confidence bounds to equal a survival probability threshold, said survivable probability function derived from said historical maintenance data.

17. The maintenance interval determination and optimization tool of claim 16, further comprising:

an economic analysis module comprising programmed instructions stored in computer readable memory, said programmed instructions performing an economic analysis to determine whether costs associated with performing the associated maintenance task according to the suggested maintenance interval for the one or more components is feasible if the maintenance task is a non-safety task.

* * * * *